(12) United States Patent
Maijala et al.

(10) Patent No.: US 9,145,232 B2
(45) Date of Patent: Sep. 29, 2015

(54) FIBER OR PLASTIC BASED PACKAGE, APPARATUS, METHOD, PROGRAM AND SYSTEM FOR WIRELESS DATA COMMUNICATION BY FIBER OR PLASTIC BASED PACKAGE

(75) Inventors: Juha Maijala, Kellokoski (FI); Raimo Mäkelä, Lohja (FI); Petri Ilkka, Nokia (FI)

(73) Assignee: STORA ENSO OYJ, Helsinki (FI)

( * ) Notice: Subject to any disclaimer, the term of this patent is extended or adjusted under 35 U.S.C. 154(b) by 167 days.

(21) Appl. No.: 13/806,669

(22) PCT Filed: Jun. 22, 2010

(86) PCT No.: PCT/FI2010/050534
§ 371 (c)(1),
(2), (4) Date: Feb. 21, 2013

(87) PCT Pub. No.: WO2011/161299
PCT Pub. Date: Dec. 29, 2011

(65) Prior Publication Data
US 2013/0175282 A1    Jul. 11, 2013

(51) Int. Cl.
| | | |
|---|---|---|
| *B65D 25/00* | (2006.01) | |
| *G06K 19/077* | (2006.01) | |
| *H01R 43/00* | (2006.01) | |
| *G06K 17/00* | (2006.01) | |

(52) U.S. Cl.
CPC ............ *B65D 25/00* (2013.01); *G06K 17/0022* (2013.01); *G06K 19/07737* (2013.01); *G06K 19/07741* (2013.01); *H01R 43/00* (2013.01); *B65D 2203/10* (2013.01); *G06K 2017/009* (2013.01); *Y10T 29/49117* (2013.01)

(58) Field of Classification Search
USPC ................ 455/41.1, 66.1, 550.1, 575.1, 90.1, 455/90.3, 347, 351; 340/551, 561, 565, 340/568.1
See application file for complete search history.

(56) References Cited

U.S. PATENT DOCUMENTS

| | | |
|---|---|---|
| 6,628,199 B1 | 9/2003 | Ehrensvärd et al. |
| 7,170,409 B2 | 1/2007 | Ehrensvärd et al. |
| 7,178,417 B2 | 2/2007 | Petersen et al. |

(Continued)

FOREIGN PATENT DOCUMENTS

| | | |
|---|---|---|
| CA | 2353350 A1 | 1/2003 |
| DE | 43 27 342 A1 | 2/1995 |

(Continued)

OTHER PUBLICATIONS

International Preliminary Report on Patentability and Written Opinion issued Apr. 1, 2011, in PCT International Application No. PCT/FI2010/050534.

(Continued)

*Primary Examiner* — Thanh Le
(74) *Attorney, Agent, or Firm* — Birch, Stewart, Kolasch & Birch, LLP

(57) ABSTRACT

A fiber or plastic based package includes: an interface adapted to attach and connect, in a detachable manner, a module to a fiber or plastic based package, the module including a wireless transmitter, and the interface including conductors for transferring package data from the fiber or plastic based package to the module. A module, system and software are also implemented in connection with the fiber or plastic based package. A smart package, its management and various applications thereof are provided.

33 Claims, 9 Drawing Sheets

(56) References Cited

U.S. PATENT DOCUMENTS

| | | | |
|---|---|---|---|
| 7,468,664 B2 * | 12/2008 | Daughton et al. | 340/551 |
| 7,593,708 B2 * | 9/2009 | Tandy | 455/90.3 |
| 2008/0054007 A1 | 3/2008 | Mador | |

FOREIGN PATENT DOCUMENTS

| JP | 4-244352 A | 9/1992 |
|---|---|---|
| JP | 2003-93476 A | 4/2003 |
| JP | 2003-173346 A | 6/2003 |
| JP | 2004-67202 A | 3/2004 |
| JP | 2006-519737 A | 8/2006 |
| WO | WO 2004/078787 A1 | 9/2004 |
| WO | WO 2005/081157 A1 | 9/2005 |

OTHER PUBLICATIONS

Extended European Search Report issued in European Application No. 10853564.2 on May 28, 2014.

* cited by examiner

FIBER OR PLASTIC BASED PACKAGE, APPARATUS, METHOD, PROGRAM AND SYSTEM FOR WIRELESS DATA COMMUNICATION BY FIBER OR PLASTIC BASED PACKAGE

FIELD OF TECHNOLOGY

The invention relates to a fiber or plastic based package. In addition, the invention relates to an apparatus for wireless data communication by a fiber or plastic based package. Furthermore, the invention relates to a method, and software for said method, for wireless data communication by a fiber or plastic based package. The invention additionally relates to a system for wireless data communication by a fiber or plastic based package.

BACKGROUND

Present fiber or plastic based (alternatively, fiber based, paper based etc.) packages intended for packaging goods or objects the use and storage of which need to be tracked, monitored or observed require human based or manual solutions to implement these things. Examples of such packages include e.g. medicine packages, food packages, various packages for goods and so on. The opening, use, storage, preservability, temperature, handling etc. of packages need to be monitored and observed so as to ensure the appropriate use and condition of the packaged goods. A problem with packages has been the reading, collecting or obtaining the information associated with the packages so that such information can be used and applied.

A known solution to the problem, brought about by Cypak, has been to use a special reader, or reader device. However, such a reader device has to be a highly specialized apparatus, suitable exclusively for a certain type of package suitable for the reader device. Therefore, there should exist at the reading site, such as a pharmacy or hospital, for example, a special reader device which is able to read the information on the package, say, instructions on a medicine package. It is a drawback that the reader device must be specially tailored and designed for the package in question. Another drawback of this known solution is that the package must include a transmitter (and possibly a receiver) implemented and designed in a fixed and integrated manner, capable of communicating information from the package to the reader device, which transmitter could be e.g. a special integrated transmitter or a rfid type transmitter reader loop or such. In addition, people, such as the personnel in a pharmacy or shop, need to learn to use the reader device.

In practice, a separate reader is a disadvantage for this known solution because, for example, the overall costs of the solution are very significant on the packaging scale, the reader device may get lost in which case a new one needs to be purchased, people need to learn to use the reader, the use of the reader is human based, i.e. manual, etc. All this requires expensive, complicated and/or difficult-to-use technology of both the package and the reader device proper.

SUMMARY

An object of the invention is to provide a more useful and advantageous package monitoring solution.

In accordance with one aspect of the invention there is provided a fiber or plastic based package comprising:
an interface adapted to attach and connect, in a detachable manner, a module to a fiber or plastic based package, the module comprising a wireless transmitter, and the interface and package comprising conductors for transferring package data from the fiber or plastic based package to the module.

In accordance with another aspect of the invention there is provided a system comprising:
a fiber or plastic based package,
a module,
a server, wherein:
an interface in the fiber or plastic based package is adapted to attach and connect, in a detachable manner, the module to the package, the module comprising a wireless transmitter, and the interface comprising conductors for transferring package data from the fiber or plastic based package to the module and further to the server through the wireless transmitter whereafter the data are received at the server.

In accordance with another aspect of the invention there is provided a method in which:
data are received at an interface adapted to attach and connect, in a detachable manner, a module to a fiber or plastic based package, the module comprising a wireless transmitter, and the fiber or plastic based package comprising conductors for transferring package data,
the data obtained from the fiber or plastic based package are forwarded from the interface to the module.

In accordance with another aspect of the invention there is provided a program comprising a software logic adapted for wireless data communication by a fiber or plastic based package, the program being adapted:
to receive data through an interface adapted to attach and connect, in a detachable manner, a module to a fiber or plastic based package, the module comprising a wireless transmitter, and the fiber or plastic based package comprising conductors for transferring package data,
the data obtained from the fiber or plastic based package are forwarded from the interface to the module.

The numerous alternative embodiments of the invention make it possible to monifor and control fiber or plastic based packages in a more advantageous manner. In addition, conductors implemented through printed electronics, e.g. in the package or interface, make possible an advantageous structure, and the detachably attached module communicates the data obtained from the conductors wirelessly to the system associated with the package data.

BRIEF DESCRIPTION OF THE DRAWINGS

The numerous embodiments of the invention are described, in an exemplifying manner, as follows, with reference to the accompanying drawings where.

SOME EXAMPLES OF NUMEROUS OPTIONAL EMBODIMENTS OF THE INVENTION

Figure 1:
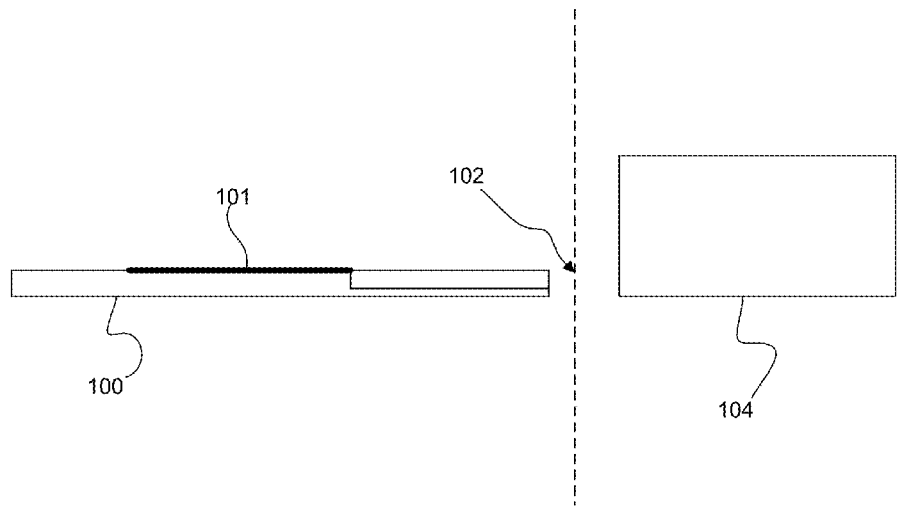
FIG. 1 shows in accordance with an embodiment of the invention an example of a fiber or plastic based package with a module which can be attached and connected to it in a detachable manner.

Next, the invention will be described using some embodiments as examples. One exemplifying embodiment of the invention relates to a fiber or plastic based package and to the arrangement of wireless data communication of package data from the package. An embodiment of the invention makes possible the manufacture and use of fiber or plastic based packages for monitoring medicine intake, package opening, package tampering, food preservation, temperature etc. In one embodiment of the invention it is possible to use fiber or plastic with printed conductors (or wires), e.g. paperboard or plastic, resulting in a recyclable solution. The package comprises an interface adapted to attach and connect the module in a detachable manner to the fiber or plastic based package. The module comprises a wireless transmitter and the interface comprises conductors for transferring package data from the fiber or plastic based package to the module. The package includes at least one or more conductor units implemented through printed electronics or bonded onto the package for collecting or producing package data. This unit for the collection of package data may be e.g. a switch, selector, sensor or such. So, a wireless transmitter unit module can be connected and attached to the fiber or plastic based package in a detachable manner. The module receives the package data from the printed conductor unit. The module is configured so as to be wirelessly connected with a system receiver so that at least part of the package data can be transferred to the system receiver. So, the wireless transmitter unit module wirelessly transfers the package data or the information related to the contents of the package to the system. The module may also include other components representing conventional technology such as a memory, central processing unit or dedicated integrated circuits or such. In addition the module includes a power source such as a battery, for example. In one exemplifying embodiment the processor may be configured to control the power consumption of the module so that it consumes very little power and when necessary, e.g. upon receiving a command or trigger, activates the transmitter or memory of the module. This way, energy can be saved in the module.

One exemplifying embodiment of the invention comprises a package, such as a medicine, food or other package for which there exists a need to obtain information about the package and/or its contents. The package has a built-in docking station for the module. In such an embodiment there is no need for a separate connector or separate reader device. The package has a docking station or connector or transport station into which a module is connected which is designed for a wireless link such as a mobile link, for example. So, the docking station is in the package into which a relatively small mobile card module, say a GSM, GPRS, or 3G module, is connected. This way, a cost-effective structure can be achieved using printed conductors or printed electronics in the package. The conductors are printed direct on the package and they connect the docking station into package solutions implemented with printed electronics. In one exemplifying embodiment the conductors are printed on fiber or plastic. In another exemplifying embodiment, in addition to or independent of the above, the conductors are printed on the blister card, such as the aluminum foil of a medicine package. The conductors thus serve as carriers of information. The package may also be such that the fiber or plastic part contains the conductors whereby it serves as a support structure as well as a carrier of information by means of the conductors. Alternatively, the fiber or plastic portion without conductors serves as a support structure and the blister card serves as the carrier of information. In one exemplifying embodiment the conductors may be attached to the package, e.g. tape-like conductors of laminated aluminum attached to or built in the package.

In one exemplifying embodiment the package contains a Cypak chip from which data are transferred to the module through conductors implemented by means of printed electronics in the fiber or plastic based package. The module uses a mobile link to send the data to a server. This way the data can be sent to health care units and such from a medicine package, for instance. Alternatively, no Cypak chip is needed but the module is connected by means of printed conductors. In that case the package includes switches or the like implemented through printed electronics, communicating direct with the docking station and the module attached thereto.

FIG. 1 shows an exemplifying embodiment of a fiber or plastic based package 100 with a module 104 which can be attached and connected to it in a detachable manner. The fiber or plastic based package 100 comprises conductors 101 printed on paperboard, e.g. switches, wires, electronic parts or portions thereof etc., implemented by means of printed electronics or the like. In FIG. 1 the package 100 is shown detached from the module 104 which means the interface 102 is inactive and information, in the form of electric current or pulse, for example, is not being transferred between the package 100 and the module 104. Advantageously the package 100 can be be detached from the module 104, so the module 104 need not be a fixed or integrated part of the package 100.

In FIG. 2 the package 100 is attached to the module 104. Thus the package 100 is connected with the module 104. Now the information 106 can be communicated through the interface 102 from the package 100 to the module 104. For example, the printed conductors 101 in the package 100 receive and forward the information 106, in the form of electric current, for example, through the interface 102 to the module 104. Alternatively, when the module 104 is connected and attached to the package 100, the conductors 101 of the package load the information 106 into the module 104 through the interface 102.

Figure 2A:
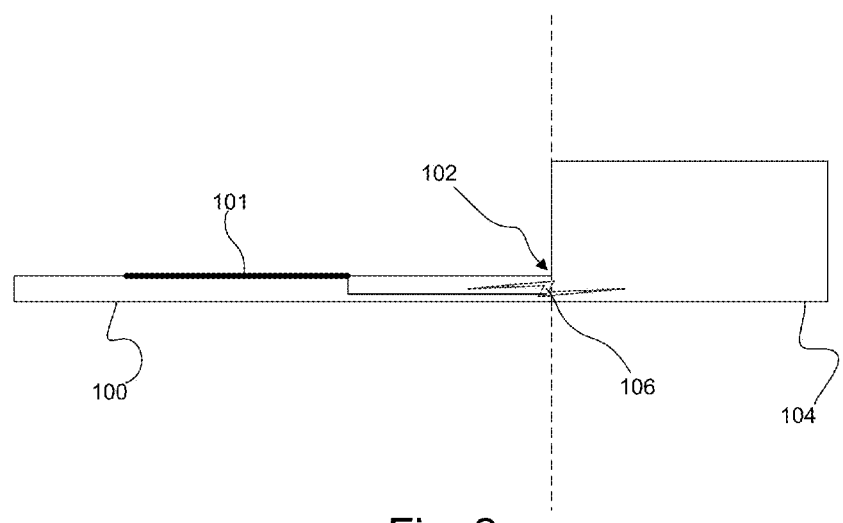
FIGS. 2a, 2b, 2c, and 2d show some of the numerous examples of embodiments of the invention, where the module can be attached to the package in many different ways.
Figure 2B:
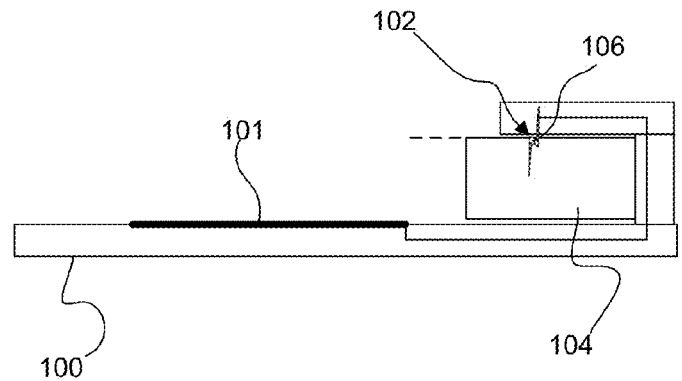
Figure 2C:
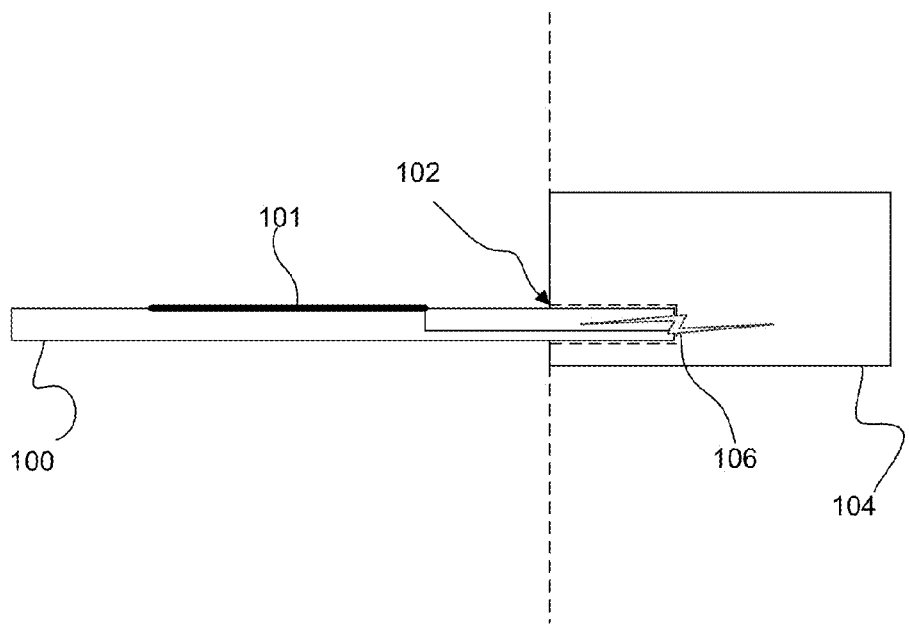
Figure 2D:
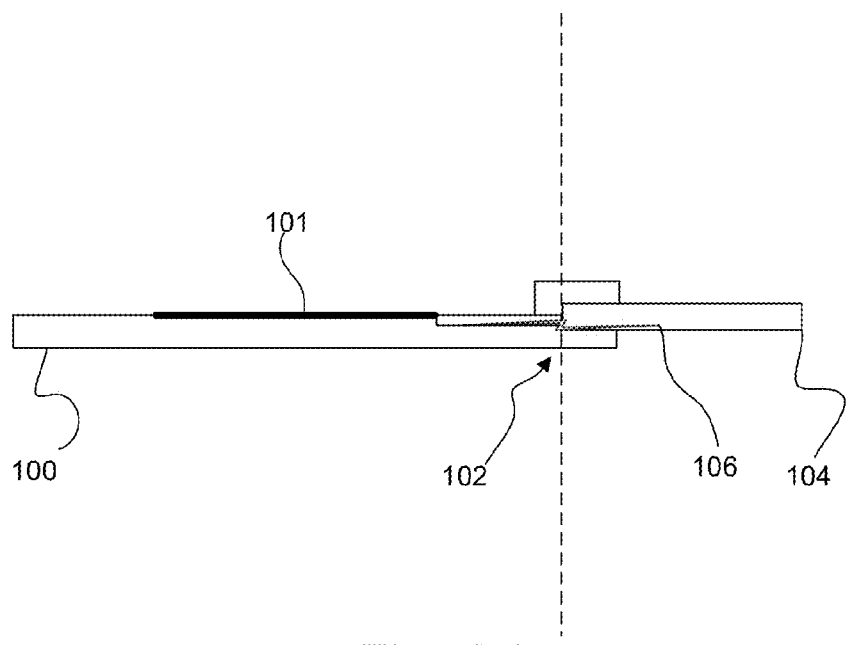

The module 104 can be attached to the package 100 in many different ways. Some examples are depicted in FIGS. 2a, 2b, 2c, and 2d and the invention is not limited to these embodiments but they merely serve to illustrate the numerous applications of the invention. The package 100 can be connected to the module 104 using a direct docking connection as in FIG. 2a. The package 100 can be bent so as to form a docking station for the module 104. In that case the package 100 especially supports and also mechanically attaches the module 104. The package 100 can be inserted into the module 104 so that the package and/or module 104 support and dock each other. The module 104 can have a slot or notch into which the package 100 can be inserted and locked as in FIG. 2c. The package 100 may frame and connect with the module 104 through the interface 102, as is illustrated in the example of FIG. 2d. Additionally, some examples concerning the attachment and connection of the package 100 and module 104 are given in conjunction with FIGS. 7 and/or 8.

Figure 3:
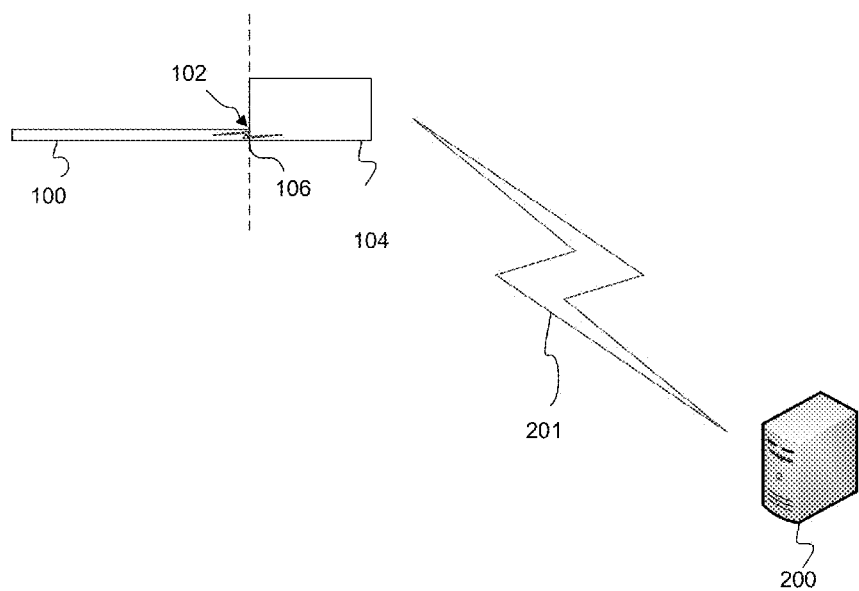
FIG. 3 shows, as an example, a system in accordance with an embodiment of the invention.

FIG. 3 shows a system where the module 104 connected to the package 100 transmits information 106 related to the package 100 wirelessly 201 to a server 200. Information 106 is registered from the package 100 into the module 104. The module 104 receives the information 106 from the package 100. The module 104 establishes a wireless connection 201 with the server 200. The wireless connection may be a GSM, GPRS or 3G connection or the like. The information is sent over the connection 201 to the server which receives the information. The information 100 from the package can thus be used by the system. Advantageously, the system employs standards with no need for a separate reader device but the module 104 can directly communicate with the server 200. For example, a health care centre can thus receive information about medication taken by a patient, and time etc. Similarly, a shop's storage system can receive information about the transportation, temperature or condition of a package or some other relevant information related thereto.

A text message or similar wireless short message, such as a message according to the SMS technology, for instance, can be advantageously applied in one exemplifying embodiment of the invention to wirelessly 201 transmit the information 106 from the module 104 to the server 200. In that case, advantageously, users, such as patients in one particular case, can be securely identified by means of a SIM card, on a per packet basis. So, SMS users can also be securely identified for the system. Advantageously, a SIM card can be used for secure authentication and identification.

In FIG. 3, a signal 201 sent from the module 104 is detected by a receiver in the server 200. Alternatively, the server 200 may be referred to as a centre. In one embodiment, the server 200 is in part a router or a server centre or a computer or the like, for example. The receiver of the server is located near the module 104 so that a wireless connection can be used, e.g. the module could be within a coverage area of a mobile network. If a router is used, the signal 201 is relayed from the receiver to the router and further to a possible second router and so on until the signal reaches the server 200.

In one embodiment of the invention the server 200 includes a receiver, and the server 200 may be a wireless terminal with the necessary reading and system equipment, or a fixed unit from which information is transferred through wires to a terminal or server in the centre. The signal received at the terminal is processed by software, and the information, such as the information concerning a medicine, for example, is automatically transferred to the relevant system, say, a health care or patient management system.

Figure 4:
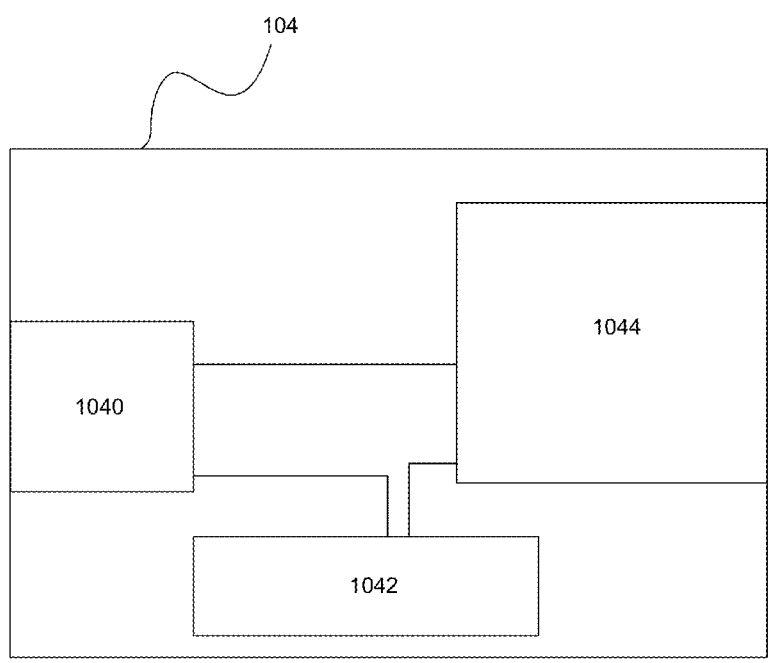
FIG. 4 shows, as an example, an embodiment of the module.

FIG. 4 shows, as an example, an embodiment of the module 104. The module comprises a power supply 1042, modem 1044, and a controller MCU 1040. The module 104 is encased so it can be carried and handled separately and independently of the package 100. The modem 1044 in the module 104 may be configured for mobile communications, for example, such as GSM, GPRS, 3G etc. Advantageously, in one embodiment, the module 104 is a plastic encased module for a CE/EN approved GPRS data network, attachable to a customer's smart package 100, such as a medicine package, for instance. In one example, a 4-frequency GPRS module can be used. Advantageously, to minimize power consumption in the module 104, it is kept for most of the time switched off and activated by the MCU 1040 when needed. The MCU 1040 may be an 8-bit unit, for example. The MCU 1040 is connected to the package 100 through the interface 102. The MCU 1040 receives from the package 100 the information 106 which controls the operation of the MCU 1040. In one exemplifying embodiment, the MCU 1040 recognizes an intake of pills from a medicine package, which information is received via the printed conductors 101 of the package 100, and a pressing of push-buttons on the package, for instance. Based on the information 106 the MCU controls e.g. the following things: power management, battery, real time, reminders, alarms and data transmissions in the module 104 and so on. So, it is possible that the package 100 no longer contains any active electronics but only the printed conductors 101. For example, in the example case of a medicine package, part of a push-button set and pill push-through detection. For the detection of 36 push-buttons (or the push-through of 36 pills) the package 100 has 12 or 10 output lines, for instance. In this example, the module 104 can monitor the intake of pills during a day, and the software in the MCU 1040 gives a rough time of day for the pill intake, e.g. the hour when the pill was taken. Advantageously, to save power and costs, the MCU 1040 electronics need not include an accurate real time clock but the time is synchronized when the connection is established by the modem 1044, and time is counted using only the inexpensive internal oscillator of the MCU 1040. This way, the clock in the module 104 is made accurate enough.

Still referring to the example depicted in FIG. 4, the module 104 includes a power supply 1042 such as a lithium-ion battery, for instance, which supplies power to the module 104. The power consumption of the module 104 is controlled by an 8-bit MCU 1040. For the most part of the time, the MCU 1040 keeps the mobile module 1044 switched off. Connection is made only once or twice a day, for example. At that point the MCU 1040 is triggered and, consequently, the MCU 1040 sends out a command to activate the modem 1044. During the active connection the power consumption is high, on the order of 200-400 mA, for example. It could also be 100 mA, if the connection time is suitable. This saves energy in the power supply 1042.

Thus, the connection could be established once per day, for example. Naturally, other cycles are possible as well, and the invention is not limited to the example described here. So, the connection can be used sparsely, e.g. once a day, and/or the duration of the connection can be made as short as necessary. In addition, the field strength and capacity of the mobile network can be taken into account.

The MCU 1040 of the module 104 collects the information 106 obtained from the conductor 101 of the package 100. For example, the MCU 1040 may collect event data about pill intake as well as read possible push-button presses. This is done by waking up the MCU 1040 from a sleep mode by means of an interrupt. When the conductor 101 receives an input, such as an impulse, for instance, it is relayed to the MCU. Otherwise the MCU 1040 is in a sleep mode, consuming very little power. Alternatively, the MCU 1040 is configured to control the conductors 101 also in the sleep mode. The MCU 1040 may also be configured to maintain a rough real time. Intake of pills can be reported on the basis of this, for example. If needed, the time can be reset when the connection to the server 200 is established. This way, even an inaccurate clock will keep time reasonably well.

In one embodiment, the module 104 is configured to pack the information to be sent into a small file for transmission. At connection time, the module 104 uses the modem 1044 to connect, through a mobile network, with the server 200 to which the file is to be sent. The time of the clock in the module 104 can be updated from the server 200 at the same time.

The module 104 includes the electronics needed for the package 100 and a battery 1042 which supplies electricity to the module 104. The module 104 is connected directly to the conductors 101 printed on the package using the interface 102. Advantageously, when the package 100 becomes empty, the module 104 can be moved to another package 100'. The module 104 is thus recyclable, reusable and environment-friendly.

In some exemplifying embodiments, the battery 1042 in the module 104 may have a life as follows:

| Battery capacity mAh | Life, days | Life, months |
|---|---|---|
| 750 mAh | 110 | 3.5 |
| 1000 mAh | 150 | 5 |
| 1200 mAh | 175 | 5.7 |
| 1500 mAh | 220 | 7 |

In these examples, the life of the battery 1042 is configured using a connection time of one minute per day, for instance. The values given above do not limit the invention, nor are they mandatory values but, instead, they may vary as functions of connection time, power consumption, connection interval and so on.

In one exemplifying embodiment, the modem 1044 comprises a 4-band modem (850/900/1800/1900). The module 104 further comprises a case by means of which it can be attached to the package 100. The module 104 additionally comprises a battery 1042, charging and shielding circuits, RF antenna, eventual loudspeaker (audio), and a SIM card connector. The physical size of the module 104 may be 33 mm×33 mm×3.3 mm, for example. Naturally, other sizes are possible and the invention is not in any way limited to these dimensions. The size of the case may be 60 mm×40 mm×8 mm or 60 mm×40 mm×4 mm, for example, depending on the battery 1042.

In one exemplifying embodiment, the capacity of the battery 1042 is 1500 mAh, if data transmission requirements from the package 100 to the server 200 are high. Naturally, the capacity of the battery 1042 may vary in accordance with different applications of the package 100. For example, if the battery 1042 supplies power also to the package 100 and the module has an MCU 1042 controlling the power need, power can be significantly saved and the capacity of the battery 1042 can be downgraded to 750 mAh or less. This way, a battery life of more than a year can be achieved, if necessary. The capacity of the battery 1042 is not a limitation necessary for the invention, but it can vary in accordance with different applications. Advantageously, the MCU 1040 is configured to control the operation of the module 104 and package 100 so as to save energy.

Figure 5:
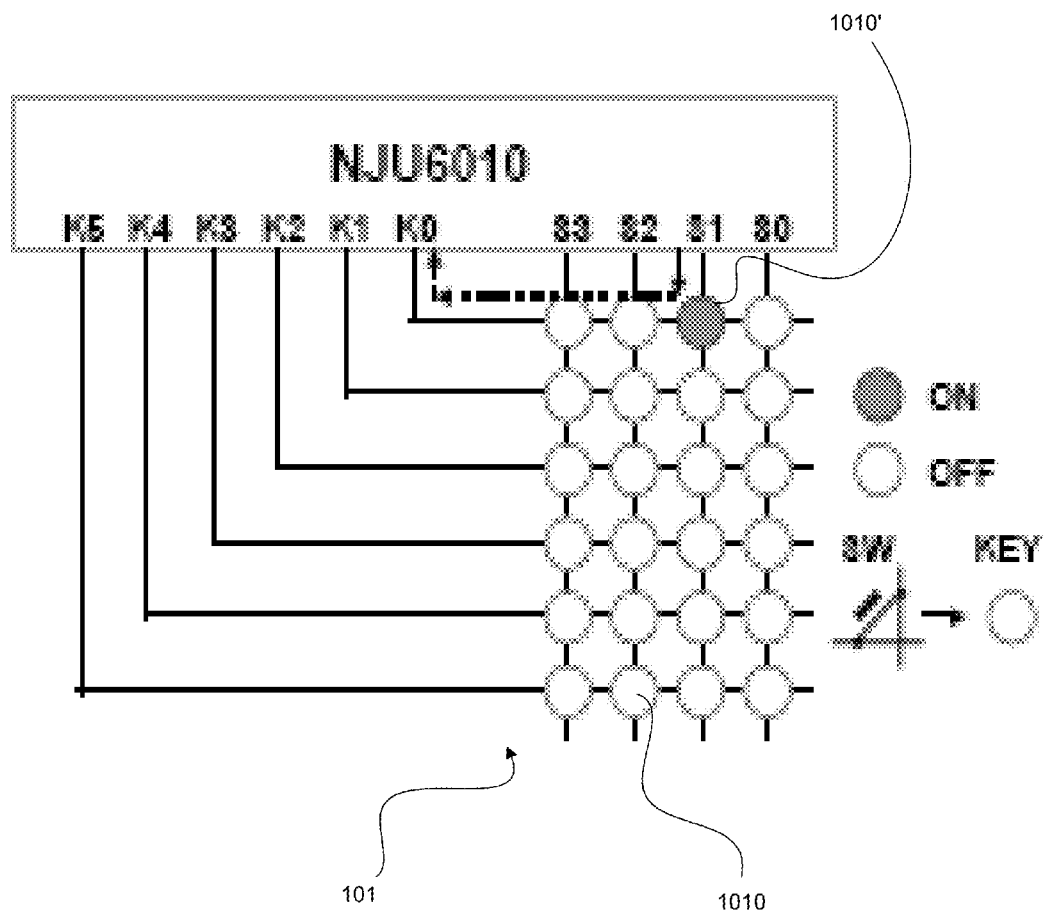
FIG. 5 shows, as an example of the embodiments of the invention, conductors printed on the package.

FIG. 5 shows, as an example of the application of the invention, conductors 101 printed on the package 100. In the example of FIG. 5, the conductors 101 are implemented on the package 100 using print-based technology. The conductors 101 comprise, for example, 32 push-buttons or switches printed on the package 100. These may have the states 'open' or 'closed' or the like. From the push-buttons or switches data are read through a serial bus from the package 100 to the modem 1044 in the module 104, from where they are sent to a server 200. The MCU 1040 can identify the switch or push-button used, as well as the time of use. For example, the connection may be established twice a day. The transmission may include the time of use and the tag ID of the switch/push-button in question. This identifies for the server 200 the event that took place in the package 100. Advantageously, also the SIM card can be identified this way.

In one example, the amount of data to be transmitted may be about 16 kb/transmission. Thus, temperature data may also be transmitted to the server 200. This way, in one exemplifying embodiment, a standby and operation time of at least 4 to 5 weeks, approximately, can be achieved for the module 104 for each charge.

Still referring to the example of FIG. 5, the conductors 101 form a resistive switch matrix. Alternatively, there may be direct conductors 101 for the push-through switches. In one additional application, the module 104 may include a beeper for sounding off an alarm e.g. when no information 106 has been received from the conductors 101 within a period of time because, for instance, the patient forgot to take the pill. Advantageously, the conductors 101 may be cost-effectively printed on the package 100. The values for the electricity used in the conductors 101 may be on the order of 3V and 40-80 uA, for example. Furthermore, the voltage may advantageously be dropped, e.g. to 1.5V.

Still referring to the exemplifying embodiments of FIG. 5, the drawing shows an attachment point 102 of the circuit board and the locations of switches 1010 and 1010'. FIG. 5 shows a location 1010 of a push-button or switch or the like. Switch 1010 is a switch in the off state, and switch 1010' is a switch in the on state. Thus, information can be collected from the applications of the package 100 and the information 106 can be sent on for analysis.

The package 100 and conductors 101 can be implemented on a paperboard substrate where the necessary wires, switches, sensors and push-buttons 1010, 1010' are produced by means of printing or similar techniques. The operation of the switches and push-buttons may be based on touch, capacitive coupling, piezoelectricity or some other corresponding method.

In one exemplifying embodiment, the conductors 101 are printed on the package using technology according to WO2009/135985. In one exemplifying embodiment, the conductors 101 of the paperboard package are implemented using an electric pattern on the paperboard. Or, more generally, in another exemplifying embodiment, using a pattern in general, or patterned onto paperboard.

Still referring to the example of FIG. 5, in one exemplifying embodiment the conductors 101 are attached to the package, e.g. tape-like conductors of laminated aluminum attached to or built in the package 100.

Figure 6:
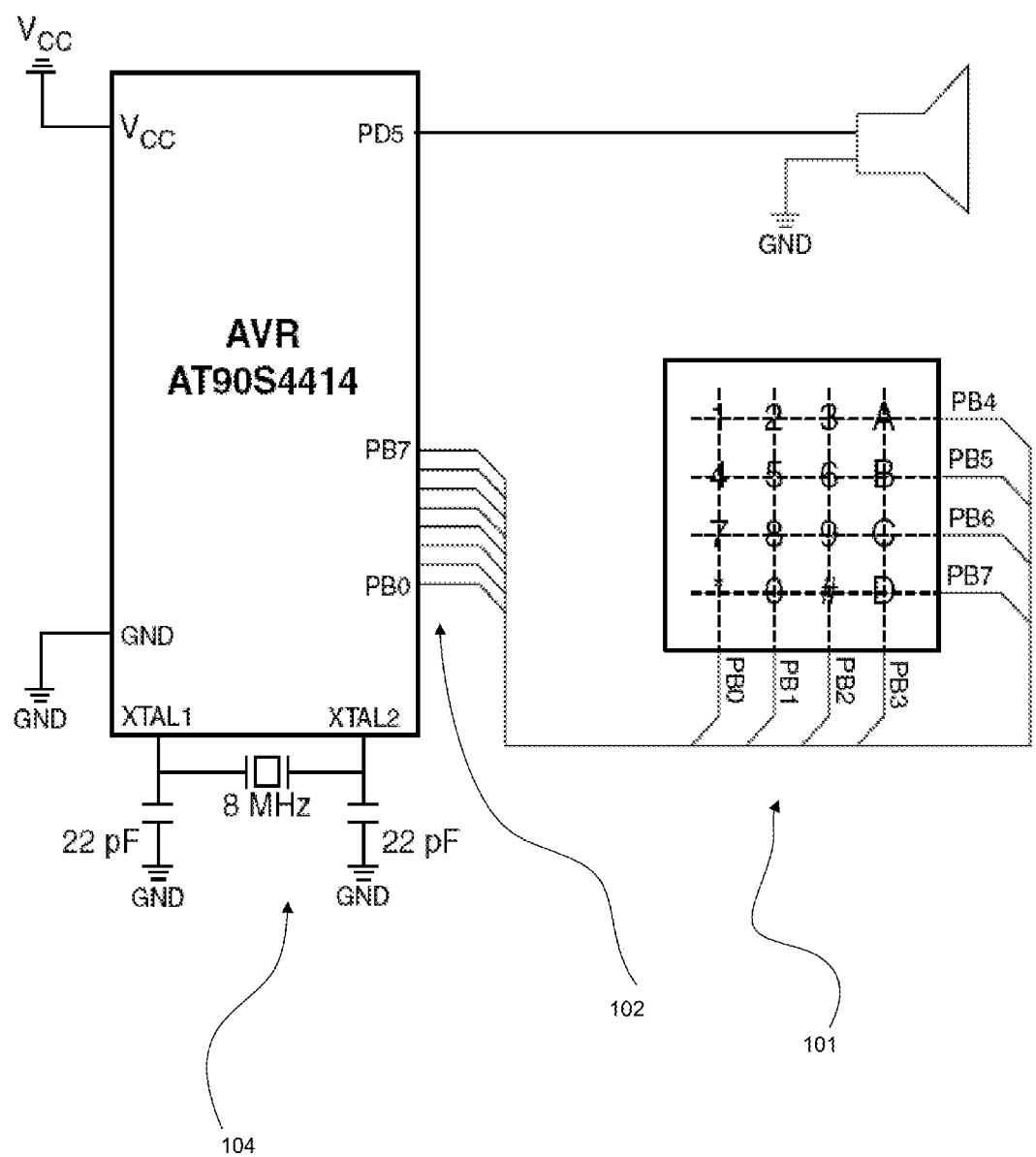
FIG. 6 shows a controller, MCU, in accordance with an embodiment of the invention.

FIG. 6 shows a controller, MCU, 1040 in accordance with an exemplifying embodiment. Alternatively, reference can be made to a controller 1040. The MCU 1040 is configured to be a relatively low-power unit for low-power applications where the power consumption is about 150 uA/3V/1 MHz clock, for example. In one exemplifying embodiment, the power consumption of the MCU 1040 in the sleep mode is adapted to be about 10 to 50 uA. However, the invention is not limited to this value for the MCU but the value may vary. For example, the MCU 1040 is a relatively low-power unit and suitable for low-power applications. The reading of conductors 101 is configured by means of an ADC or, alternatively, through I/O pins. The MCU 1040 has a calibrated RC oscillator, so the processor need not necessarily be a crystal-based one. The MCU 1040 comprises an 8-bit risc core processor or the like, which means there are enough channels for connecting the conductor 101 to the processor and MCU 1040. Also, the MCU 1040 can be implemented at fairly low manufacturing costs. The interface between the MCU 1040 and the modem 1044 is through UART or SPI, directing the serial communications to the modem 1044. Instead of the UART and SPI, other similar ones may be used. As the MCU 1040 is arranged to be programmable, many functions and logic operations can be implemented for the communication and logic between the conductors 101 and modem 1044. The MCU 1040 may thus comprise additional functions, and those can be additionally programmed therein.

Figure 7A:
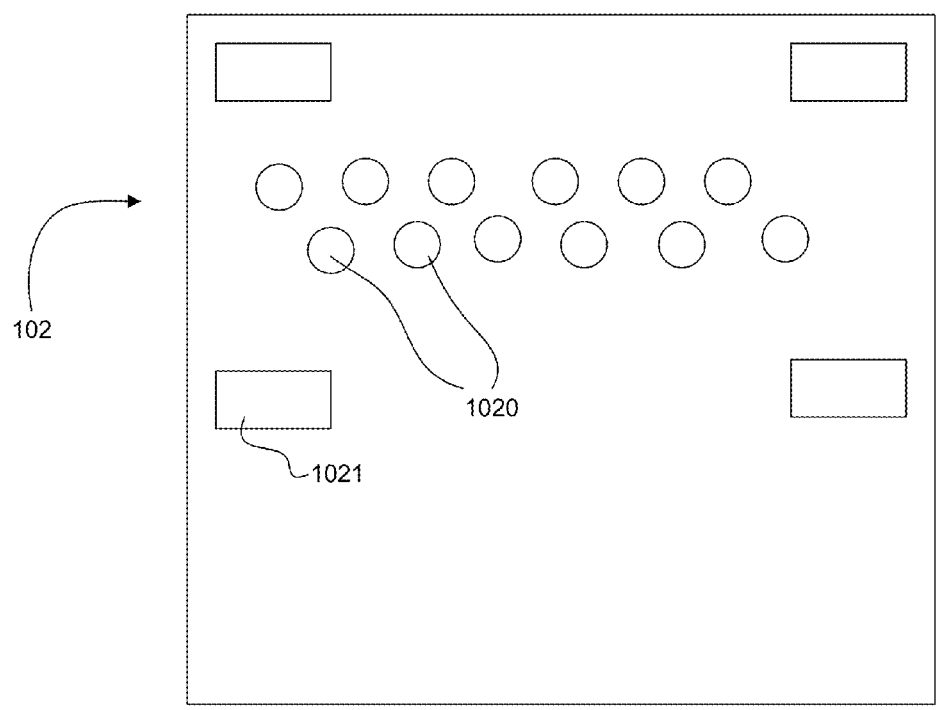
FIGS. 7a and 7b show the interface between the package and module in accordance with one embodiment of the invention.
Figure 7B:
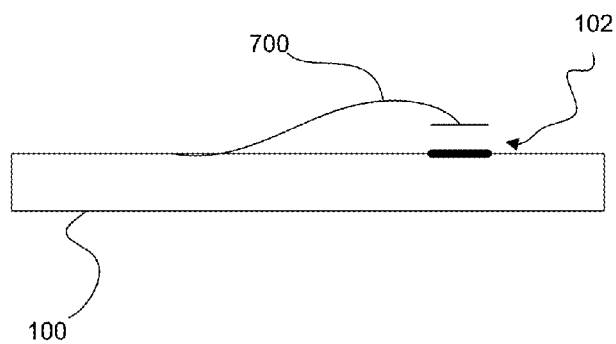

FIGS. 7a and 7b depict the interface 102 between the package 100 and module 104 in accordance with one exemplifying embodiment of the invention. FIG. 7a shows the contact area of the interface 102. The interface 102 comprises electrically conductive contact points 1020 (circles in FIG. 7a). The contact points 1020 may be bumps, hollows or flat surfaces. Instead of circles, other shapes are applicable as well. A contact point 1020 may have diameter of about 2 mm, for example. The contact points 1020 may be spaced apart by 2 mm, for example. Hollows for bumps could be about 4×2 mm, for example, corresponding to the bump size. One example of the physical size of the interface 102 is 30-40 mm×40-45 mm. These values are only to illustrate one exemplifying embodiment. One has to understand that the values can be modified and adapted for the various applications and that the invention is not limited to these values.

The interface 102, and hence the package 100 and module 102 can be detached by pulling them apart from each other. The interface 102 may be reinforced by means of attachment elements 1021 so that the interface 102 will come off by tearing if the edges are thin enough. Tearing is not necessarily needed. Can also be removed with a suitable tool.

The package 100 and module 104 may become attached to each other in such a manner that when one is inserted inside the other, the mechanical dimensions will result in attachment. In addition or alternatively, the inner surface of the slot may have a flexible bottom which exerts pressure against the pieces so that the contact points 1020 make contact and the package 100 becomes connected with the module 104. A spring 700 or rubber, for instance, could be used as an auxiliary force.

Figure 8:
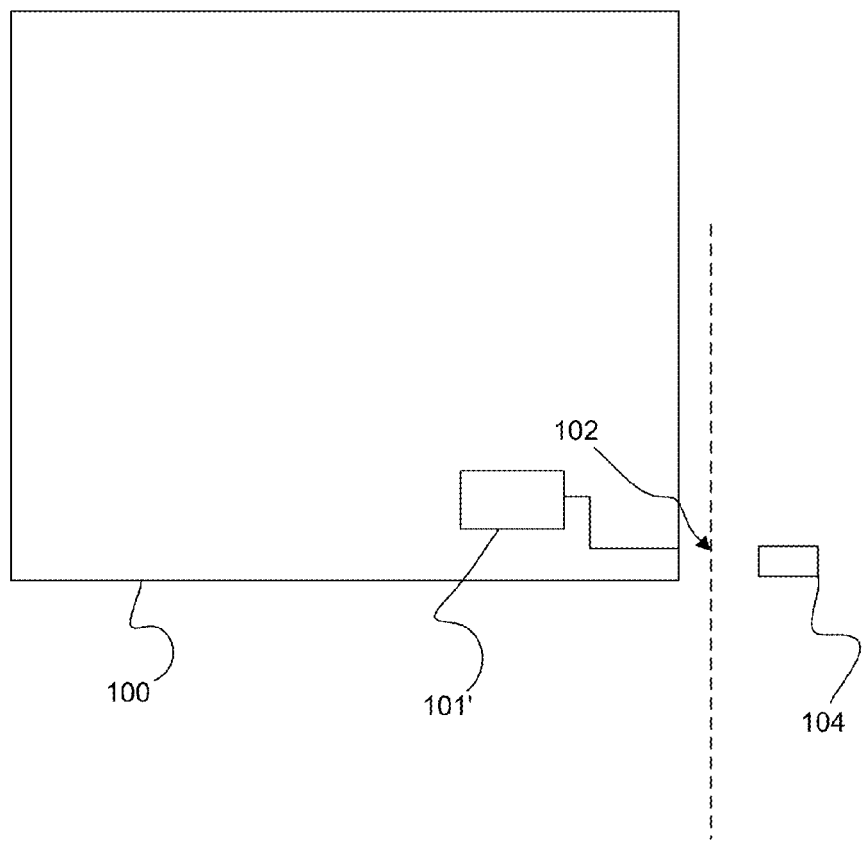
FIG. 8 shows, as an example, an embodiment of the invention where the package may be larger or considerably larger than the module which can be detachably attached to it.

FIG. 8 shows, as an example, an embodiment of the invention where the package 100 may be larger or considerably larger than the module 104 which can be detachably attached to it. Thus, larger amounts of goods and objects in the package 100 can be controlled by the module 104 in accordance with the numerous exemplifying embodiments of the invention.

It should be noted that the various embodiments of the invention have been described in conjunction with fiber or plastic based packages. In some exemplifying embodiments, the fiber or plastic based packaging material comprises paperboard. Alternatively, the fiber or plastic based packaging material may also comprise paper or the like, for instance. As an alternative to fiber in one embodiment of the invention it is possible to use plastic, polymer films or the like. It should be noted that in conjunction with the exemplifying embodiments of the invention, fiber or plastic may also refer to at least those mentioned above and their equivalents. Therefore, the substrate 100 may be almost any insulating and plane-like blank, fiber, fiber-like mesh, textile, wallpaper, coating, biomaterial, ceramic substrate, glass etc. The substrate 100 may be coated or uncoated, and it may be based on wood or not based on wood. Each substrate has its own advantages and drawbacks which are taken into account in the package used. As for temperatures, the substrate may be e.g. such that it can tolerate temperatures of 200° C., especially below 250° C. or, advantageously, below 300° C. regarding the melting point or the plasticity of the material.

Furthermore it should be noted that, in addition to health care applications, the numerous embodiments of the invention can also be used in other service subscription applications as well. A medicine package and its monitoring and data collection is just one application of the invention. The invention is applicable to the collection of package data in general, for instance. Various time stamps of packages can be read. Temperatures of packages can be monitored. Acceleration of packages can be monitored etc.

Repercussions and scope of Invention

There are many details in the description above, but those details are only to illustrate the invention and should not be construed as limiting the scope of the invention. It should be noted that many details can be combined in numerous ways in one or more applications of the invention. So, it is obvious to a person skilled in the art that many modifications and variations can be done on the equipment without departing from the characteristics or spirit of the invention.

The invention claimed is:

1. A fiber or plastic based package, comprising:
   an interface adapted to attach and connect, in a detachable manner, a module to the fiber or plastic based package, the module comprising a wireless transmitter, and the interface and package comprising conductors for transferring package data from the fiber or plastic based package to the module, and the wireless transmitter comprising a modem configured for mobile phone communications, and
   wherein the interface comprises electrically conductive contact points through which the conductors connect to the electric parts of the module.

2. A fiber or plastic based package according to claim 1, wherein the conductor in the fiber or plastic based package comprises at least one or more conductors printed on the fiber or plastic based package for the purpose of collecting package-related information.

3. A fiber or plastic based package according to claim 1, wherein the conductor in the fiber or plastic based package comprises at least one or more conductors attached to the fiber or plastic based package for the purpose of collecting package-related information.

4. A fiber or plastic based package according to claim 1, wherein the interface comprises a docking station by which the module can be mechanically attached and electrically connected to the package in a detachable manner.

5. A fiber or plastic based package according to claim 1, wherein the conductors in the package are configured to monitor the packaged goods and produce package-related information.

6. A fiber or plastic based package according to claim 1, wherein the conductors comprise a switch, a selector, a detector, a sensor, or an indicator.

7. A fiber or plastic based package according to claim 1, wherein the switch is based on inductance, magnetism, touch, capacitive coupling, or piezoelectricity.

8. A fiber or plastic based package according to claim 1, wherein the package comprises a transport package, a storage package, or a protective package.

9. A fiber or plastic based package according to claim 8, wherein the package is a medicine package or a food package.

10. A fiber or plastic based package according to claim 1, wherein, when the module is detached, the interface is arranged to attach and connect another module to the package in a detachable manner.

11. A fiber or plastic based package according to claim 1, wherein the conductors in the package comprise a push-through detector for detecting when an object in the package is pushed out of the package.

12. A fiber or plastic based package according to claim 1, wherein the interface comprises a bent portion of the package so that the module can be attached to the bent portion of the package in a detachable manner.

13. A fiber or plastic based package according to claim 1, wherein the interface package is adapted so as to be pushed into the module and thereby faun an interface.

14. A fiber or plastic based package according to claim 1, wherein the interface comprises a notch or slot in the package into which the module is adapted to be attached.

15. A fiber or plastic based package according to claim 1, wherein the interface further comprises an attachment element for reinforcing the mechanical attachment.

16. A fiber or plastic based package according to claim 1, wherein the interface is adapted such that the dimensions of the package and module result in mechanical attachment and electrical connection.

17. A fiber or plastic based package according to claim 1, wherein the interface further comprises a flexible element for the attachment.

18. A fiber or plastic based package according to claim 1, wherein the module comprises a transmitter and is configured to wirelessly transmit the package-related information to a system.

19. A fiber or plastic based package according to claim 1, wherein the wireless connection comprises a mobile connection and the module is configured for a mobile connection.

20. A fiber or plastic based package according to claim 1, wherein the module comprises a power supply configured to supply power both to the module and, through the interface, to the package.

21. A fiber or plastic based package according to claim 1, wherein the module comprises a controller configured to control the power consumption in the module.

22. A fiber or plastic based package according to claim 1, wherein the controller, while in sleep mode, is configured to receive a command from the package, waking up the module to perform the operation corresponding to the command.

23. A fiber or plastic based package according to claim 1, wherein the module is configured to additionally perform the storing of data corresponding to the command or wireless transmission of data corresponding to the command.

24. A fiber or plastic based package according to claim 1, wherein the module comprises a controller configured to control the battery, power consumption, real time, reminders, alarms, or data transmission, in the module.

25. A fiber or plastic based package according to claim 1, wherein the controller is configured to synchronize its clock to the system clock received by the wireless link of the modem.

26. A fiber or plastic based package according to claim 1, wherein the module comprises a case so that the module can be handled independent of the package.

27. A fiber or plastic based package according to claim 1, wherein the fiber or plastic based package comprises paperboard, paper, cardboard, plastic, or films.

28. A fiber or plastic based package according to claim 1, wherein the fiber or plastic based package comprises a substrate whose melting point or plasticity point can tolerate temperatures of 300° C.

29. A fiber or plastic based package according to claim 1, wherein the fiber or plastic based package comprises a substrate whose melting point or plasticity point can tolerate temperatures of under 200° C.

30. An apparatus comprising a package according to claim 1.

31. A system comprising:
a fiber or plastic based package,
a module,
a server, wherein:
an interface in the fiber or plastic based package is adapted to attach and connect, in a detachable manner, the module to the package, the module comprising a wireless transmitter, the wireless transmitter comprising a modem configured for mobile phone communications, and the interface comprising conductors for transferring package data from the fiber or plastic based package to the module and further to the server through the wireless transmitter whereafter the data are received at the server, and wherein the interface comprises electrically conductive contact points through which the conductors connect to the electric parts of the module.

32. A method comprising steps in which:
data are received at an interface adapted to attach and connect, in a detachable manner, a module to a fiber or plastic based package, the module comprising a wireless transmitter which comprises a modem configured for mobile phone communications, and the fiber or plastic based package comprising conductors for transferring package data,
data received from the package are forwarded to the module.

33. A non-transitory computer readable medium storing a computer program that comprises a program logic adapted for wireless data communication by a fiber or plastic based package, the computer program when executed causes a processor to perform the steps of:
receiving data at an interface adapted to attach and connect, in a detachable manner, a module to a fiber or plastic based package, the module comprising a wireless transmitter, the wireless transmitter comprising a modem configured for mobile phone communications, and the fiber or plastic based package comprising conductors for transferring package data, and
forwarding the data received from the package to the module.

* * * * *